(12) United States Patent
Knowles

(10) Patent No.: US 11,645,225 B2
(45) Date of Patent: May 9, 2023

(54) PARTITIONABLE NETWORKED COMPUTER

(71) Applicant: Graphcore Limited, Bristol (GB)

(72) Inventor: Simon Knowles, Bristol (GB)

(73) Assignee: GRAPHCORE LIMITED, Bristol (GB)

(*) Notice: Subject to any disclaimer, the term of this patent is extended or adjusted under 35 U.S.C. 154(b) by 0 days.

(21) Appl. No.: 17/818,855

(22) Filed: Aug. 10, 2022

(65) Prior Publication Data

US 2022/0382707 A1    Dec. 1, 2022

Related U.S. Application Data

(63) Continuation of application No. 16/831,572, filed on Mar. 26, 2020, now abandoned.

(30) Foreign Application Priority Data

Mar. 27, 2019 (GB) ..................................... 1904265

(51) Int. Cl.
*G06F 15/173* (2006.01)
*G06N 20/00* (2019.01)
*G06K 9/62* (2022.01)

(52) U.S. Cl.
CPC .. *G06F 15/17375* (2013.01); *G06F 15/17318* (2013.01); *G06K 9/6256* (2013.01); *G06N 20/00* (2019.01)

(58) Field of Classification Search
None
See application file for complete search history.

(56) References Cited

U.S. PATENT DOCUMENTS

| 2019/0045003 | A1 |   | 2/2019  | Archer |              |
|--------------|----|---|---------|--------|--------------|
| 2020/0293478 | A1 | * | 9/2020  | Knowles | G06N 3/08   |
| 2020/0311529 | A1 | * | 10/2020 | Knowles | G06F 15/17387 |
| 2021/0349847 | A1 | * | 11/2021 | Knowles | G06F 15/80  |

OTHER PUBLICATIONS

Chen Juan, Reducing Static Energy in Supercomputer Interconnection Networks Using Topology-Aware Partitioning, IEEE Transactions on Computers, IEEE, USA, vol. 65. No 8, Aug. 1, 2016. pp. 2588-2602.

(Continued)

*Primary Examiner* — Dov Popovici
(74) *Attorney, Agent, or Firm* — Haynes and Boone, LLP

(57) ABSTRACT

A computer, including a plurality of processing nodes arranged in two-dimensional arrays in respective front and rear layers. Each processing node has a set of activatable links. When activated, transmission of data items between the nodes connected via the activated link is enabled. When not activated, transmission of data items between the nodes is prevented. The set of activatable links including a respective link which connects the processing node to each adjacent node in the array, and to a facing processing node in the other layer. An allocation engine is configured to receive an allocation instruction and connected to the processing nodes to selectively activate the links in a configuration.

20 Claims, 13 Drawing Sheets

(56) References Cited

OTHER PUBLICATIONS

Conner S, Link Shutdown Opportunities During Collective Communications in 3-D Torus Nets, Parallel and Distributed Processing Symposium, 2007. IPDPS 2007. IEEE International, IEEE, PI, Mar. 1, 2007, pp. 1-8.
Totoni Ehsan, Toward Runtime Power Management of Exascale Networks by on/off Control of Links, 2013 IEEE International Symposium on Parallel & Distributed Processing Workshops and PhD Forum, IEEE, May 20, 2013, pp. 915-922t.
International Search Report dated Jun. 18, 2020 for Application No. PCT/EP2020/058618. 17 pages.
Combined Search and Examination Report dated Jun. 22, 2020 for Patent Application No. GB2004424.4. 12 pages.
Examination Report dated Jun. 21, 2021 for Patent Application No. GB2004424.4. 3 pages.
Camera et al., "Twisted Torus Topologies for Enhanced Interconnection Networks", IEEE Transactions on Parallel and Distributed Systems, vol. 21, No. 12, pp. 1765-1778, Dec. 2010.

\* cited by examiner

PARTITIONABLE NETWORKED COMPUTER

CROSS-REFERENCE TO RELATED APPLICATIONS

The present application is a continuation of U.S. patent application Ser. No. 16/831,572, filed Mar. 26, 2020, which claims priority to United Kingdom Patent Application No. 1904265.4, filed on Mar. 27, 2019. The aforementioned applications are hereby incorporated by reference in their entireties.

FIELD

The present disclosure relates to computer network topology processing nodes connected in a computer particularly but not exclusively for facilitating portioning for machine learning/artificial intelligence tenant applications.

BACKGROUND

Collectives are routines which are commonly used when processing data in a computer. They are routines which enable data to be shared and processed across multiple different processes, which may be running on the same processing node or different processing nodes. For example, if one process reads data from a data store it can use a "broadcast" process to share that data with other processes. Another example is when the result of a particular function is needed on multiple processes. A "reduction" is a result which has required the application of a compute function to a data value from each of multiple processes. "Gather" and "Scatter" collectives handle more than one data item. Certain collectives have become increasingly important in processing machine learning applications.

MPI (Message Passing Interface) is a message passing standard which can be applied to many parallel computing architectures. MPI defines a number of collectives applicable to machine learning. Two such collective are termed "Reduce" and "Allreduce". A Reduce operation enables a result of a compute function acting on multiple data values from different source processes to be provided at a single receiving process. Note that a receiving process may be one of the source processes, and that there may be multiple receiving processes. The Allreduce collective reduces the data values from multiple source processes and distributes the results to all the source processes, (which are acting as receiving processes for the reduced result). According to the MPI Standard, the Allreduce collective may be implemented by reducing the data values from all source processes in a reduce collective (e.g. at one of the processes) and then broadcasting the result to each source process.

FIG. 1 is a schematic block diagram of a distributed architecture for training a neural network. A source of training data 100 is provided. This may be a database or any other kind of data store capable of holding training data applicable to the neural network model being trained. Processing according to the neural network model is itself distributed across multiple processing units 110a, 110b, 110c etc. Only three units are shown in FIG. 1, but it will readily be appreciated that any number of processing units could be utilised. Each processing unit 110a, b, c receives batches of training data from the training data source 100. Each processing unit 110a, b, c holds a set of parameters 112a, 112b, 112c which define the model. An incoming batch of training data is processed with a current set of parameters in a calculation function 114 and the results of the calculation function are used to generate so-called deltas which represent the difference between the original parameter and the new parameter as a result of applying the calculating function on the batch of training data and the current set of parameters. In many neural networks, these parameters are termed "weights" and so the delta values are termed "delta weights". The weights are labelled 112a, b, c and the delta weights are labelled 116a, b, c in FIG. 1. It will be appreciated that in practice the weights and delta weights are stored in suitable stores accessible by the processing unit. If the weights and delta weights can be held in local memory, this renders the training process much more efficient.

The aim with the architecture of FIG. 1 is not to train three separate models but to train a single model in a distributed manner. Therefore, the purpose is to have the model parameters (or weights) converged to a single common set in each processing unit. It is evident that starting from any particular set of weights, and assuming that the batch of training data received at each processing unit is not identical, then there will be a variation in the delta weights which are produced by each calculation function in each processing unit. What is needed therefore is a way to combine and distribute the delta weights across the processing units after each iteration of batched training data. This is shown diagrammatically in FIG. 1 where a combinational function 118 receives the delta weights from each processing unit and performs a mathematical function which reduces the delta weights, such as an averaging function. The output of the combinatorial function 118 is then fed back to combining circuitry 120a, 120b and 120c within each processing unit respectively. A new set of weights is thus produced as a combination of the original weights and the combined output from the combinatorial function 118, and the new weights 118a, 118b, 118c are stored back into local memory. Then, the next batch of training data is supplied to each processing unit and the process repeats multiple times. It is evident that if the starting weights of the processing units are the same, then after each iteration they will be reset again to the same, new values. It can readily be seen that the above is an example of where the Allreduce function is particularly useful. The delta weights are supplied to the combinatorial function 118a where they are reduced, and they are then supplied back to each of the processing units in their reduced form, where they can be combined with the original weights.

FIG. 1A is a schematic diagram to illustrate how an Allreduce collective might be implemented in a line connected topology of six processing nodes $N_0 \ldots N_5$. These processing nodes may correspond to the processing units of FIG. 1 in which the combinational function is distributed between the nodes so that there is no longer a combining node as in FIG. 1. The processing nodes are shown connected in a line configuration where each processing node is connected to its neighbour by a "forwards" links $L_F$ and a "backwards" link $L_B$. As shown in the diagram, and as the directional phrases imply, the forward links connect processing nodes from the left to right in FIG. 1A, and the backwards links connect processing nodes from the right to left in FIG. 1A. Each processing node has a processing capability designated 200, and a storage capability designated 202. The processing capability and storage capability can be implemented in any of a very large number of ways. In one particular manifestation, the processing node may comprise multiple tiles, each individual tile having its own processing capability and associated memory capability.

Each processing node also has one or more link interface which enables it to be connected to its neighbouring node via the links $L_F/L_B$.

To understand the implementation of the Allreduce collective, assume that the first node N0 has generated a "partial" labelled Δ0. The "partial" is a set of delta weights. This is stored in the storage capability 202 ready to be exchanged in an Allreduce collective. In reality, there may be a vector of partials, where each partial corresponds to a computation on the processing node. In a simple streaming line Allreduce algorithm, the forward links are used for "reduce" and the backward links are used for "broadcast". The algorithm starts with the processing node at one end (the left hand node in FIG. 1A) sending its partial Δ0 to its adjacent node $N_1$. At this node, the incoming partial (Δ0 in this case) is reduced with the corresponding partial which was generated by the computing capability 200 at the processing node $N_1$, Δ1. The result of this reduction (shown as an ADD function in FIG. 1A) is then sent from processing node $N_1$ to the next connected node $N_2$. As mentioned further herein, the plus function could be any combinatorial function which could be used to reduce the partials. The process occurs at each processing node, until at the final processing node, denoted $N_5$ in FIG. 1A, the reduction of the partials is complete. At this point, the reduction (summation Δ) is sent back to each processing node via the backward links $L_B$. It is received at each node, stored at that node in the memory capability and then also transmitted to the next node. In this way, each processing node ends up with the reduced result.

FIG. 1B shows a timing diagram of the reduce and broadcast phases. Note that a processing node cannot send a reduced result to the next node until it has received the incoming data from the previous node. Thus, there is an inherent latency marked ΔR for each outgoing transmission on the forward links.

Furthermore, the backward links are not utilised for broadcast until the fully reduced result has been obtained at the end node. However, if the partials vectors are large, due to the pipelined effect, the lead data item of the reduced result, being the reduction of the first partials from the partial vectors at each node, will return to the starting node well before that starting node has finished sending the data items of its partial, so there may be substantial overlap of activity on all forward and backward links.

In a modification to this algorithm, which represents a small improvement, processing nodes at each end of the line can start to transmit their partials towards a central node, with the reduction being completed at the central nodes. In that case, the result is broadcast back to the end nodes. Note that in this scenario, there would be a reversal in the direction of movement, for example between nodes N2 and N3, and N3 and N4 on both the forward and backward links. If a line is closed into a ring (by connecting the final node PN4 to the first node PN0 on both the backward and forward links), a pipeline algorithm can serialise reduction and broadcast in the same direction, so that the two logical rings formed by the bi-directional links can each operate independently on half of the data. That is, each partial vector is split into two and a first half ΔA is reduced on the forward links (as in FIG. 1A), and broadcast on the connecting leg between N4 and N0. The other half of the vector ΔB is reduced on the backward links, and then broadcast on the connecting ring of the backward links such that each node receives a copy of the Allreduce result.

FIG. 1D illustrates the corresponding timing diagram for the forward and backward links.

A one-dimensional ring is shown in FIGS. 1A and 1C. The principles can be extended to rings in two dimensions such as in a toroid connected computer.

Machine learning workloads call for massively parallel compute, with efficient communication between the processing nodes. One form of topology which provides efficient ring connections is a torus. An n by n torus is shown in FIG. 3A. An n×n torus forms rings in two dimensions, with each ring having two directions assuming that the links between the processing nodes are bi-directional. In FIG. 3A, N denotes a processing node, and L denotes a link (assuming it to be a bi-directional link, although that might not be the case always). Horizontal links are labelled X, and vertical links are labelled Y. Each node therefore has four rings passing through it (X clockwise and anti-clockwise, and Y clockwise and anti-clockwise). There are 4n rings in total, each of length n.

Using rings in this dimension, an alternative approach to implement Allreduce is to use a reduce scatter collective followed by an Allreduce collective. A paper authored by Jain and Sabharwal entitled "Optimal Bucket Algorithms for large MPI collectives on torus interconnects" (ICS' 10, June 2-4, Tsukuba) presents bucket based algorithms for Allgather, reduce-scatter and Allreduce collectives assuming bi-directional links between processing nodes in a torus interconnected processor. This approach operates on the basis that there are multiple data values (partial fragments) to be handled in each step. The algorithm described by Jain et al splits partials into to 2p equal fragments on each processor, where p is the number of logical or virtual rings which can be utilised in the computer. p logical rings are pipelined in each direction, each ring in one direction starting at a different processor. In the reduce-scatter collective, each process starts with an initial partial. It is assumed that a reference here to a process is to a process carried out on a processing node. A partial vector has multiple fragments—each fragment may be for example one or more data value. The corresponding fragments of all partials are reduced and the reductions are then distributed across the processes. In the Allgather collective, every process receives all elements from all other processes. The reduce-scatter collective reduces all partials and stores each reduction on a respective node—see FIG. 2. The Allreduce collective operation can be implemented by performing a reduce-scatter collective followed by an Allgather collective operation.

As discussed in Jain's paper, torus interconnects are attractive interconnection architectures for distributed memory supercomputers. In the above discussion, collectives have been explained in the context of communication between processes. In a distributed super computer, processing nodes are interconnected, and each processing node may be responsible for one or more process in the context of collectives. A torus interconnect is a type of mesh interconnect with processing nodes arranged in an array of n dimensions, with each node connected to its nearest neighbours, and corresponding nodes on opposite edges of the array also connected. Bi-directional communication links exist between interconnected processing nodes.

The algorithms for implementing collectives which are discussed in the above-referenced paper authored by Jain and Sabharwal are applied on torus connected architectures. This allows the collectives to process different parts of the partial vectors in rings in different dimensions at the same time, making the process bandwidth efficient.

Based on the study in the Jain paper, dividing the partial vector into 8n fragments (2 dimensions×2 directions×2 phases) {reduce, broadcast}×n nodes in a ring enables bandwidth optimality. According to one AllReduce algorithm, the subdivision associated with each dimension is used as follows:

One half of the partial vectors are first reduced using the two rings along the x dimension, then along they dimension. The other half uses the dimensions in the opposite order. Then the results are broadcast likewise using dimensions in turn, but in the opposite order.

A torus can be created in three dimensions when it is referred to as hyper-torus. A hyper-torus of n×n×n nodes forms 6n rings, each of length n and has thirds of the data (namely the partial vectors) using the dimension in non-overlapping orders xyz, yzx, zxy. Note that in this case z represents the dimension perpendicular to the plane of x and y. Partial vectors are divided into 12n fragments to optimise the AllReduce algorithm in this case.

In a n×n torus, all the rings are used all the time. Rectangular toroids can also be constructed such as 2 n×n. In this case, a certain type of twisted torus allows equal ring length in both dimensions. The rings are the length of the longer dimension, 2n. FIG. 3B illustrates such a structure.

While the torus and twisted torus allow bandwidth optimality for implementation of the AllReduce algorithm, they suffer from a defect which renders them unsuitable for implementing multitenant algorithms in a computer network. Moreover, in any particular construction the configuration is preset at a certain size (number of nodes). It is not easy to provide torus and twisted torus architectures as partitions of a larger network, and maintain usable rings in the partitions.

It is an objective of the present invention to provide a configuration of interconnected processing nodes which overcome these defects, particularly but not exclusively for use in processing functions in machine learning, such as collectives.

While the topologies and configurations described herein are particularly effective for the efficient implementation of Allreduce, they may also be advantageously used for other machine learning collectives and other types of parallel programs.

SUMMARY

An aspect of the invention provides a computer comprising a plurality of processing nodes arranged in respective front and rear layers, each layer comprising a two-dimensional array of processing nodes, each processing node having a set of activatable links which, when activated, enable the transmission of data items between the processing node and an adjacent processing node connected via the activated link and, when not activated, prevent the transmission of data items between the processing node and the adjacent processing node connected via the inactive link,
the set of activatable links comprising for each processing node in the first and second layer a respective link which connects the processing node to each adjacent node in the array, and to a facing processing node in the second or first layer respectively; and
an allocation engine configured to receive an allocation instruction and connected to the processing nodes to selectively activate the links to connect at least a group of the processing nodes in a configuration in which:
(i) links between adjacent nodes within each of the first and second layers respectively are activated;
(ii) links between facing nodes are only activated for edge processing nodes of the group; and
(iii) links between processing nodes outside the group and adjacent processing nodes in the group are deactivated.

The set of activatable links may comprise two such respective links connecting the processing node to its facing processing node. In that case, two links are activated between corner facing nodes of the group.

The links may be bi-directional links.

The two-dimensional array may be an array of n by m processing nodes, and wherein the group comprises an array of p×q processing nodes in each layer where at least one of the following conditions is satisfied: p is less than n or q is less than m.

In some embodiments, m equals n. In some embodiments p equals q.

In some embodiments, the links may be SERDES links or similar, wherein each link when activated has a fixed power requirement largely independent of data traffic. That is, the link draws power when activated even when no data is being transmitted, and when deactivated consumes no power. The links may operate to transmit data by a variation in voltage from a powered voltage level on the link.

The allocation engine may comprise one or more processor configured to execute allocation computer code responsive to a user request. This processor may be a separate master machine, or could be implemented by code on each of the processing nodes themselves without the need for a separate allocation machine.

The invention also provides in another aspect a method of configuring a computer comprising a plurality of processing nodes arranged in respective front and rear layers, each layer comprising a two-dimensional array of processing node, each processing node having a set of activatable links which, when activated, enable the transmission of data items between the processing node and an adjacent processing node connected via the activated link and, when not activated, prevent the transmission of data items between the processing node and the adjacent processing node connected via the inactive link, the set of activatable links comprising for each processing node in the first and second layer a respective link which connects the processing node to each adjacent node in the array, and to a facing processing node in the second or first layer respectively, the method comprising:
selectively activating the links of each processing node in at least a group of the processing nodes to generate a networked configuration of processing nodes in which:
(i) links between adjacent nodes within each of the first and second layers respectively activated;
(ii) links between facing nodes are only activated for edge processing nodes of the group; and
(iii) links between processing nodes outside the group and adjacent the processing nodes are deactivated.

Links may be selectively activated by providing power to the link.

The invention provides in a further aspect a method of operating a group of processing nodes in a networked configuration, the method comprising configuring a computer to generate the networked configuration in accordance with the method defined above, and
operating the group of processing nodes in the networked configuration using m rings in each of two dimensions, where each ring is formed by n nodes, where n is the number of edge processing nodes in the networked configuration.

The method of operating the group may comprise dividing a partial vector generated at each processing node of the configuration into fragments and implementing a logical ring for each corresponding fragment in the partial vector to implement an Allreduce collective.

The Allreduce collective may be implemented by a reduce-scatter collective followed by an Allgather collective in the logical rings.

The logical rings may be implemented in forwards and backwards directions in each dimension.

The invention provides in a further aspect a "cushion" computer which comprises a plurality of processing nodes arranged in respective front and rear layers, each layer comprising a two-dimensional array of processing nodes, each processing node having a set of activated links which enable the transmission of data items between the processing node and an adjacent processing node connected via the activated link, wherein the processing nodes are connected in a configuration in which:
  (i) adjacent nodes within each of the first and second layers are connected by activated links;
  (ii) edge-processing nodes in each of the first and second layers are connected by activated links to their facing node in the other layer; and
  (iii) any links between processing nodes outside the configuration and processing nodes in the configuration are deactivated such that the transmission of data items is prevented between processing nodes of the configuration and processing nodes outside the configuration.

The processing nodes of the configuration can be operated to form a set of connected rings in each of X and Y directions, wherein each ring comprises the same number of processing nodes.

Each processing node may comprise memory configured to store an array of data items (such as a vector or tensor) ready to be exchanged in the reduce scatter phase, wherein each data item is respectively positioned in the array with corresponding data items being respectively positioned at corresponding locations in the arrays of other processing nodes. The array may be a partial vector "partial" (a vector of partial results) in the reduce-scatter phase or a "result" (a vector of fully reduced partials) in the Allgather phase.

The processing nodes may each be programmed to transmit data items to its adjacent processing node in each ring in a forwards (or backwards, respectively) direction in the reduce-scatter phase. The data items which may be transmitted in each step are termed a "fragment". A fragment is piece of the vector—as described herein, vectors are divided into fragments to make use of logical rings formed in the physically connected rings.

Each array may represent at least part of a vector of partial deltas, each partial delta representing an adjustment to a value stored at each processing node. Each processing node may be programmed to generate the vector of partial deltas in a compute step. Each processing node may programmed to divide its vector into two sub arrays for respective utilisation of the two rings in X and Y directions at each node.

BRIEF DESCRIPTION OF THE DRAWINGS

For a better understanding of the present invention to show how the same may be carried into effect, reference will now be made by way of example to the accompanying drawings.

DETAILED DESCRIPTION

Figure 1:
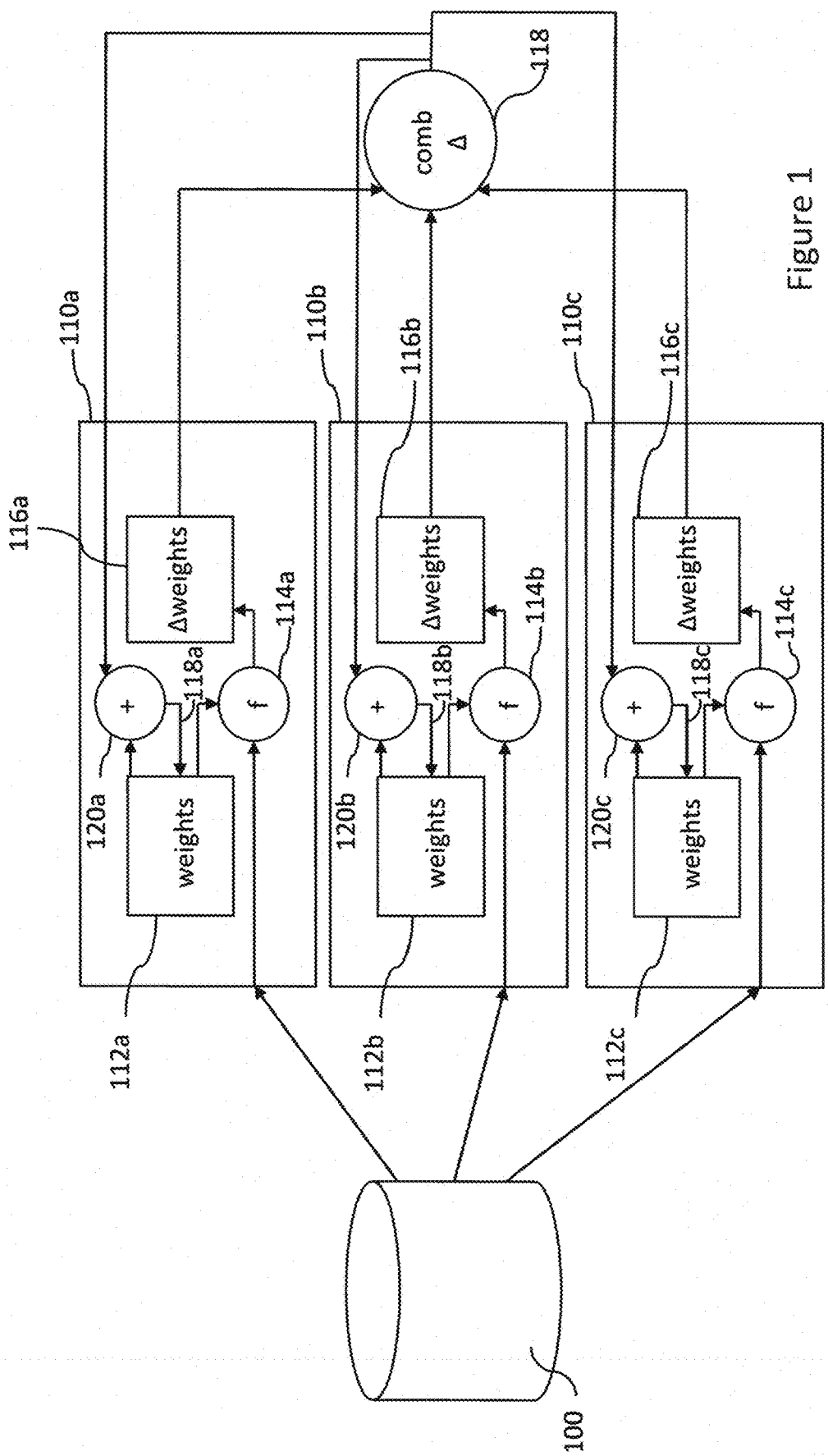
FIG. 1 is a schematic diagram illustrating distributed training in a neural net.
Figure 1A:
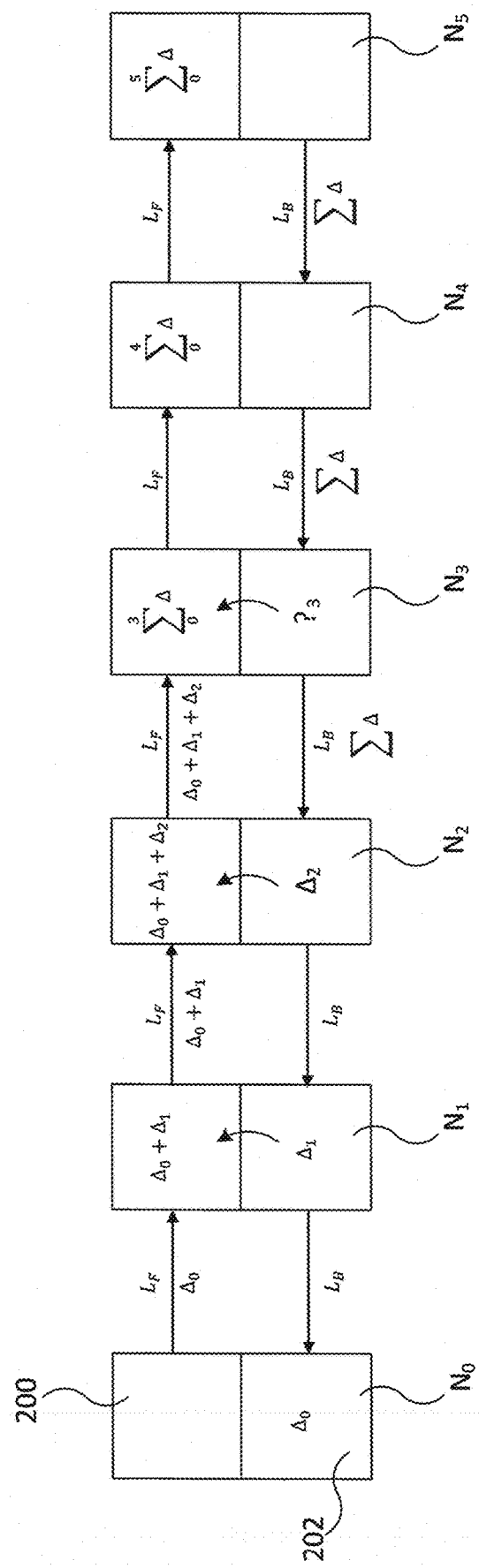
FIG. 1A is a schematic diagram showing a line of processing nodes for implementing a simple streaming line Allreduce algorithm.
Figure 1B:
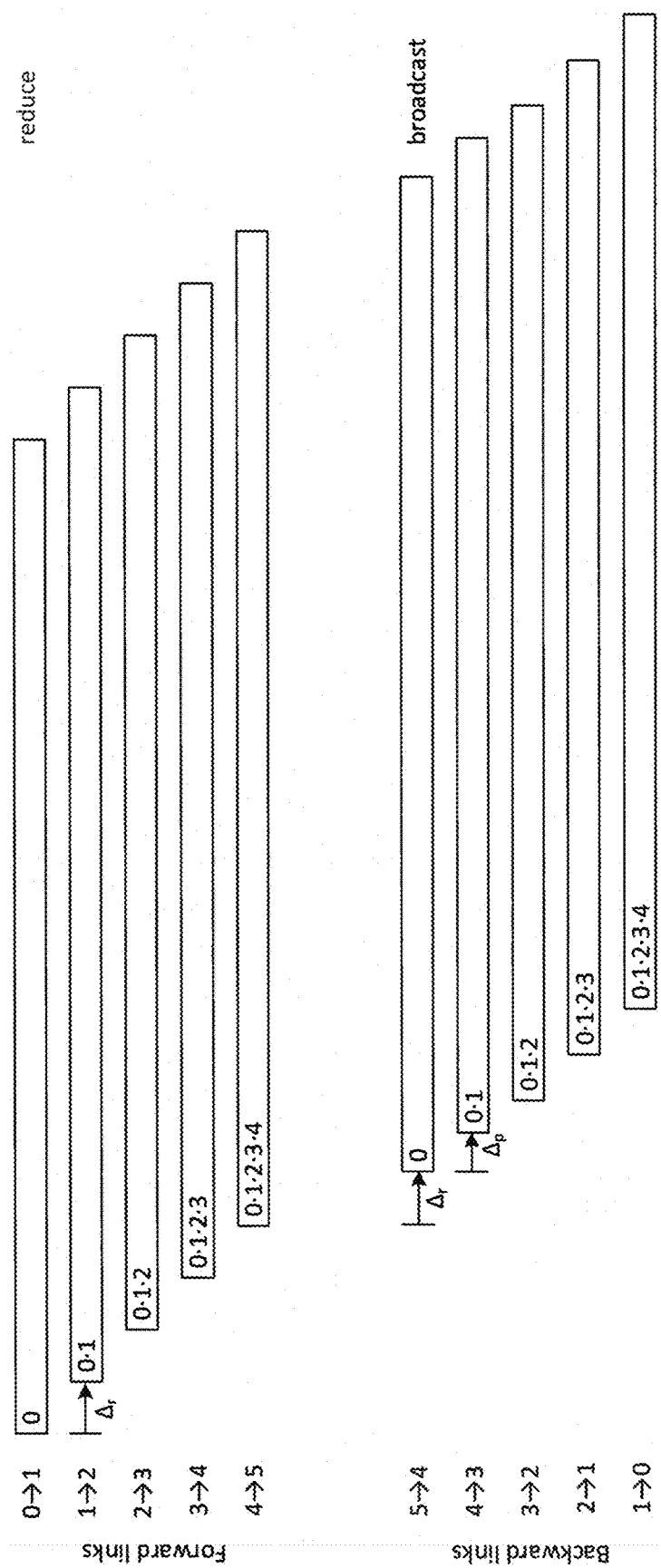
FIG. 1B is a timing diagram of a streaming line Allreduce algorithm.
Figure 1C:
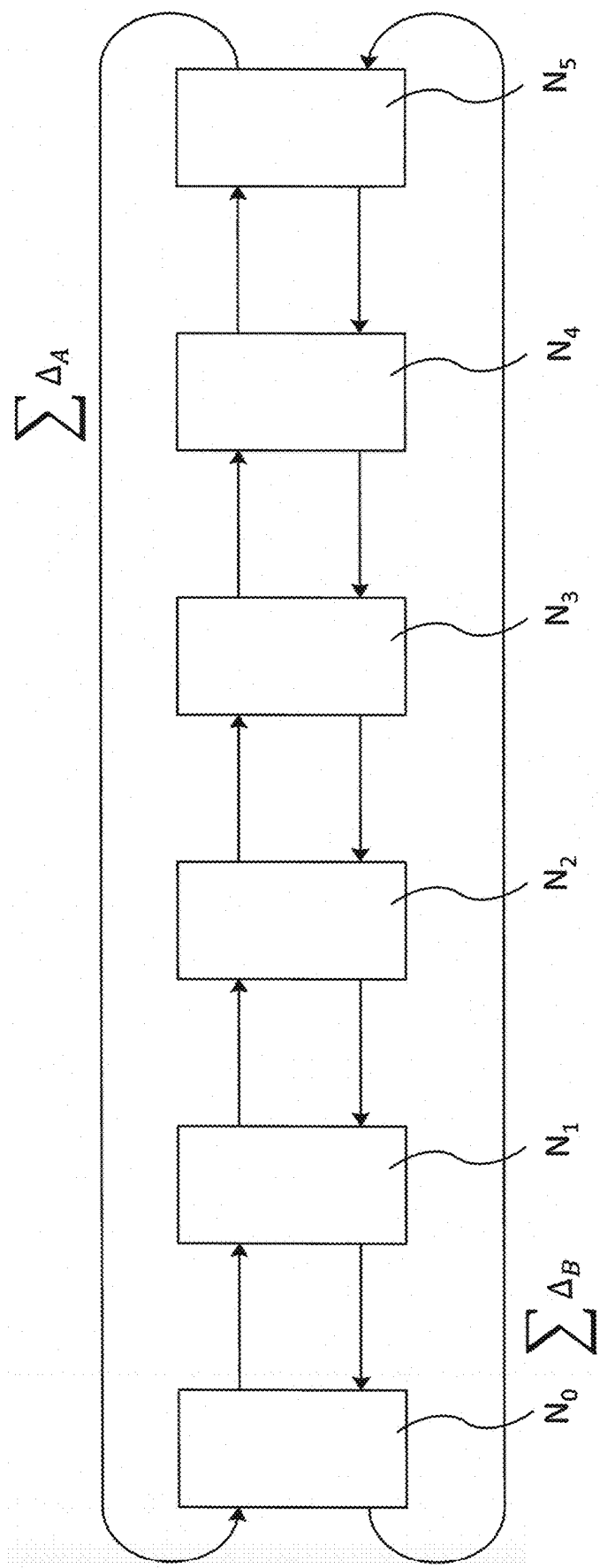
FIG. 1C shows a one-dimensional ring.
Figure 1D:
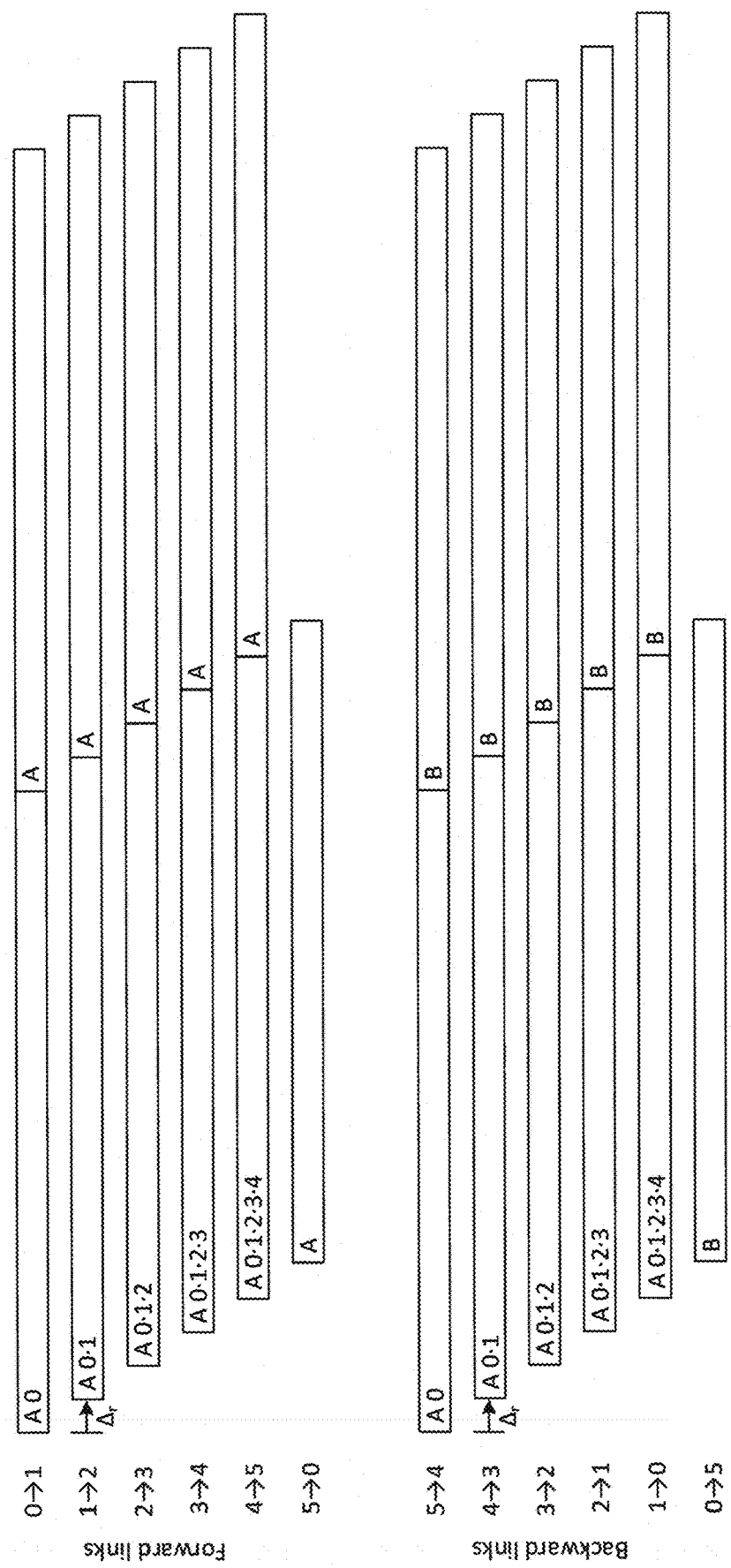
FIG. 1D illustrates the corresponding timing diagram for the forward and backward links.

Aspects of the present invention have been developed in the context of a multi-tile processor which is designed to act as an accelerator for machine learning workloads. The accelerator comprises a plurality of interconnected processing nodes. Each processing node may be a single multi-tile chip, a package of multiple chips, or a rack of multiple packages. The aim herein is to devise a machine which is highly efficient at deterministic (repeatable) computation. Processing nodes are interconnected in a manner which enable collectives, especially broadcast and Allreduce, to be efficiently implemented.

One particular application is to update models when training a neural network using distributed processing. In this context, distributed processing utilises multiple processing nodes which are in different physical entities, such as chips or packages or racks. That is transmitting data between the processing nodes requires messages to be exchanged over physical links.

The challenges in developing a topology dedicated to machine learning differ from those in the general field of high performance computing (HPC) networks. HPC networks usually emphasise on demand asynchronous all-to-all personalised communication, so dynamic routing and bandwidth over provisioning are normal. Excess bandwidth may be provisioned in a HPC network with the aim of reducing latency rather than to provide bandwidth. Over provisioning of active communication links waste power which could contribute to compute performance. A commonly used link today draws power when activated whether or not it is being used to transmit data.

Torus computer networks have been discussed above as a machine topology which is particularly adapted to super computing machine workloads, such as ML workloads.

In ML workloads, inter chip communication is currently dominated by broadcast and Allreduce collectives. The broadcast collective can be implemented by a scatter collective followed by an Allgather collective, and the Allreduce collective can be implemented by a reduce-scatter collective followed by an Allgather collective. In this context, the term inter-chip denotes any communication between processing nodes which are connected via external communication links. As mentioned, these processing nodes may be chips, packages or racks.

One particularly useful algorithm which has been developed to process the Allreduce collective in machine learning algorithms has been described above. This algorithm uses rings in a torus structure to efficiently exchange and process fragments of partial vectors. One challenge which arises however is that such torus computer networks are not easy to partition. One objective of the novel computer network discussed herein is to enable a large network of many processing nodes to be partitioned into one or more smaller networks without any or any significant hardware involvement in the partitioning. To achieve the above objectives in ML applications, rings in two dimensions need to be preserved in the allocated portions. With present torus computer networks this is not possible, as any partitioning of the torus computer network would involve breaking one or more of the rings in the torus structure.

Figure 4:
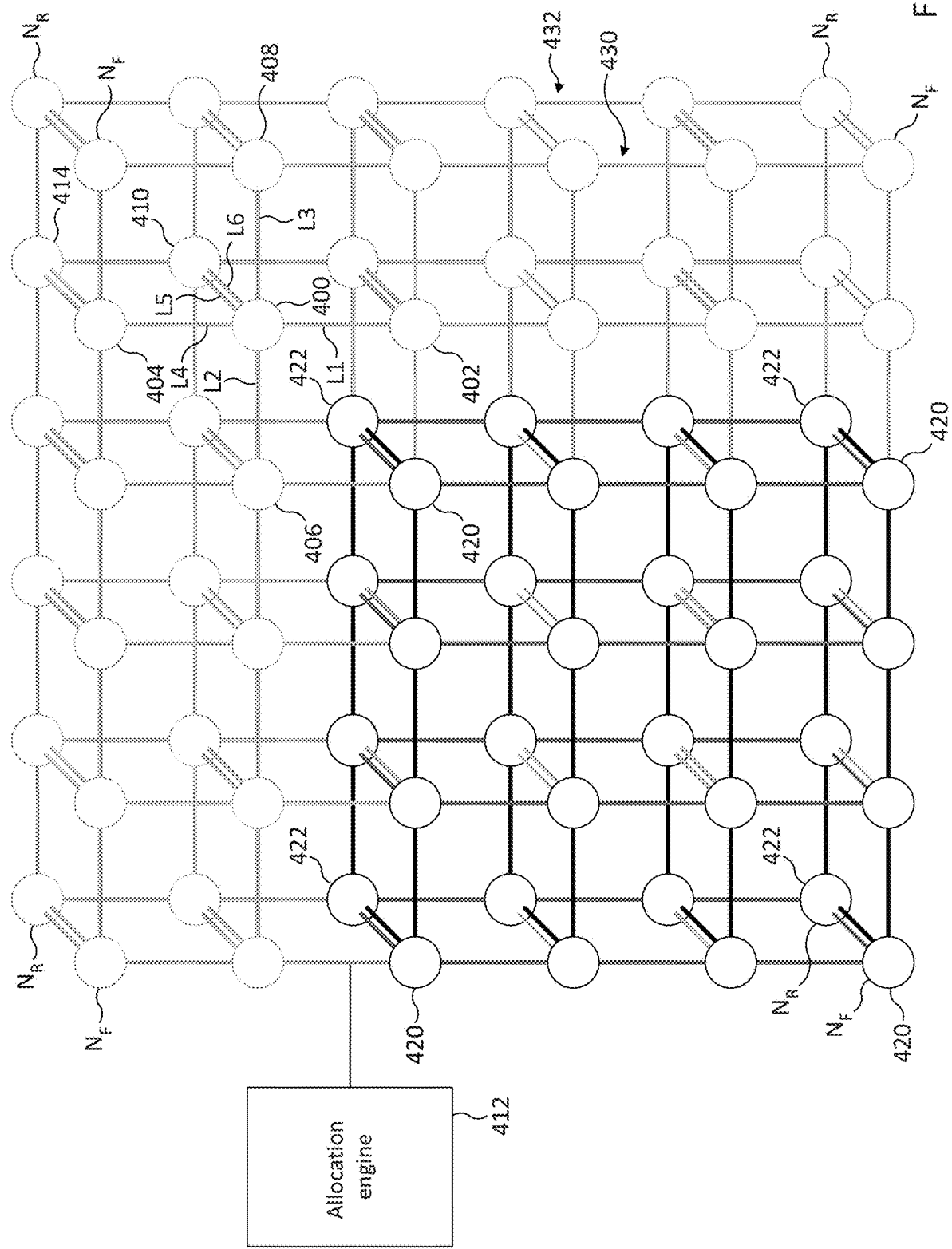
FIG. 4 shows a configurable network in which rings are maintained in allocated portions.

One reason for partitioning very large networks is to enable one or more tenant to use the network. A tenant may be described as a computer program distributed across processing nodes of the partition, the program being self-contained and controlled by a particular owner. Another requirement of partition networks is that there is no "leakage" between partitions. That is, it is highly undesirable for an owner of one tenant to be exposed to code or messages from another tenant of the partition. FIG. 4 is a schematic block diagram of a computer network topology which satisfies these criteria and which is referred to herein as a "cushion".

FIG. 4 shows a topology which comprises a front layer 430 and a rear layer 432. It will be appreciated that the denotations "front" and "rear" do not imply any particular physical orientation when the network is in use. There are used to define the relationship between processing nodes in the individual layers.

The front layer comprises an n×n array or grid of processing nodes which in the embodiment of FIG. 4 is a 6×6 array. The processing nodes $N_F$ denote the corner nodes of the front layer. The rear layer similarly comprises a 6×6 array of processing nodes, with the processing nodes $N_R$ denoting the corner nodes of the rear layer. Each layer has edges—the vertical edges are defined by the processing nodes extending vertically between the corner nodes $N_F$ or $N_R$ respectively, and the horizontal edges are defined by the processing nodes extending horizontally between the corner nodes $N_F/N_R$ respectively. Each layer also has a set of central nodes, forming a 4×4 array within the edge nodes. Reference numeral 400 denotes a typical central node in the front layer. All central nodes have the same connective characteristics. Each central node has six activatable links. Each link represents a physical connection between its central the node 400 and its adjacent nodes in the topology both within the array and between the layers. Links L1 and L4 connect the processing node 400 to its respective vertically adjacent nodes 402, 404 within the front layer. Links L2 and L3 connect the node 400 to its respective adjacent horizontal nodes 406, 408 within the front layer. Links L5 and L6 connect the node 400 to its corresponding facing node 410 in the rear layer. Each link, when activated, is a bi-directional link, for example a SERDES link as discussed further herein. Such links draw power whether or not they are transmitting data. In this context, an activated link is a link which is powered up such as to enable the transmission of data items over it. In a SERDES link, data is transmitted by changing a differential voltage on the link with respect to a base, powered up voltage. The amount of power consumed by the link is independent of the traffic on the link. Conversely, an inactive link (that is a link which is not activated) is not capable of transmitting data items because it has not been powered up to the base voltage level. Thus, an inactive link not only saves power, but also prevents unwanted access to data items from another node which is physically connected to it. This characteristic is important when considering the partitioning of the network.

If the 6×6 array were to be used as a single computer, the links between the front and rear faces on the central nodes would be rendered inactive. Furthermore, only one of the link between the facing layers would be activated at the edge nodes (see for example nodes 404 and its facing node 414). However, both of the link between the facing corner nodes PNF/PNR would be activated. That is, for each node in an active computer topology four of the six links would be active, and the remaining two would be inactive. It should be evident from this description that in the case of the central node 400 the inactive links are LF5 and LF6, and the active links are L1 through L4.

As a result of this connectivity, the word "cushion" has been coined to describe the computer network in its activated state. This is because it is joined only at its edges and not between its facing layers.

The activated computer network in this form provides two dimensions of n rings of length 2n (where n=6 in the maximum configuration of FIG. 4).

Figure 4A:
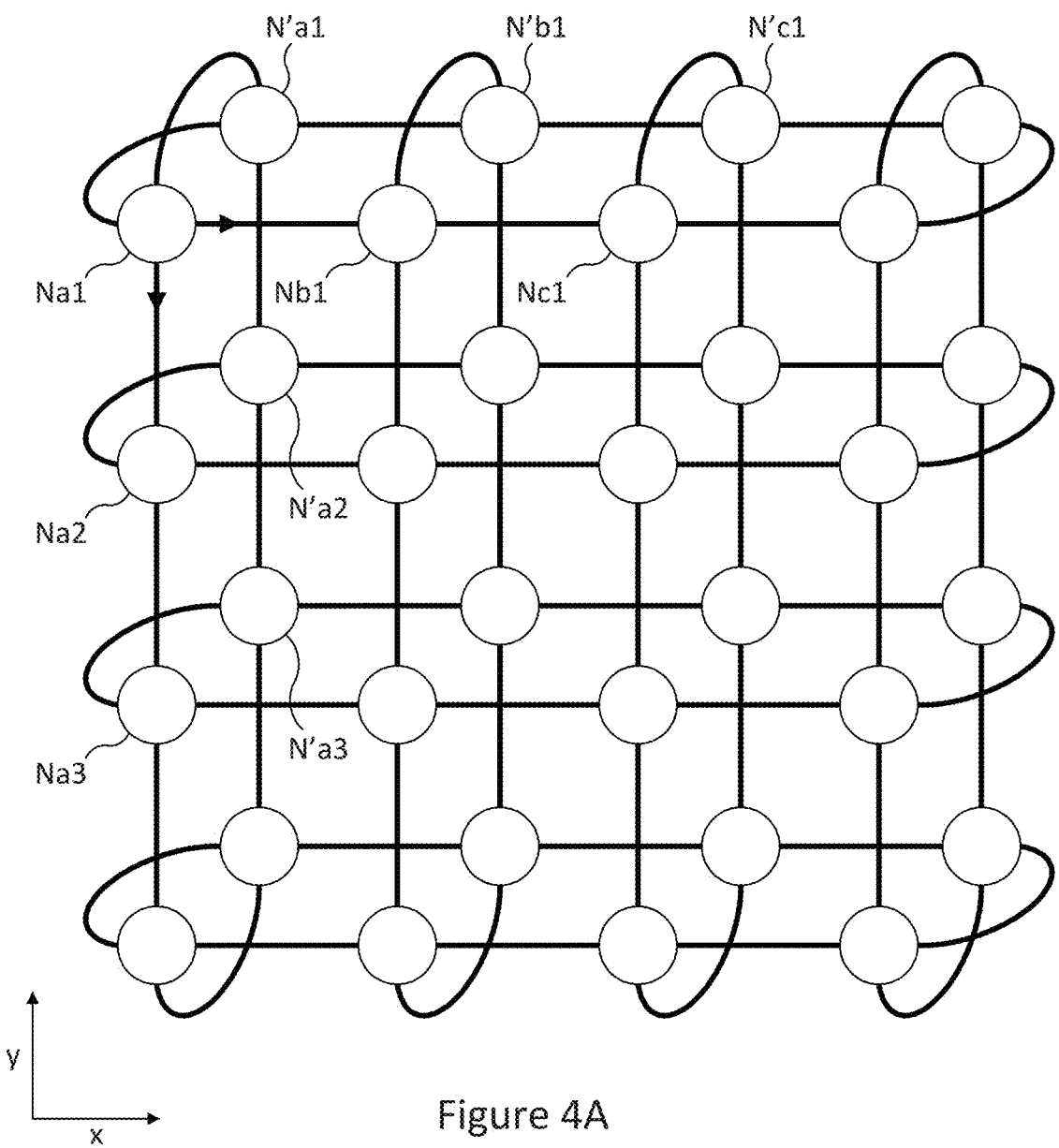
FIG. 4A is a schematic diagram of a computer having processing nodes connected in a "cushion topology".
Figure 4B:
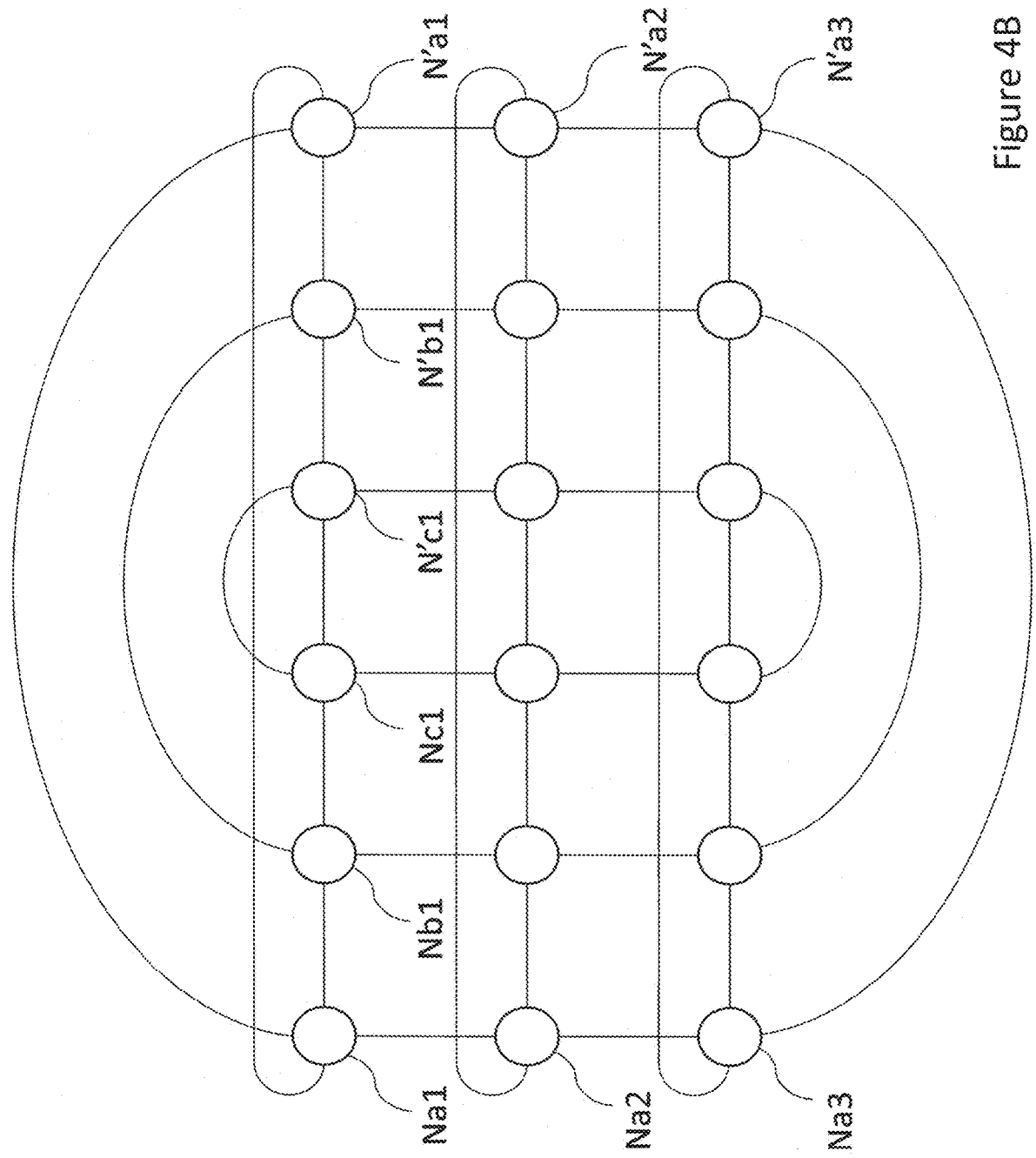
FIG. 4B shows how the rings are connected in the cushion topology of FIG. 4A.

This provides for an optimally-efficient implementation of an AllReduce algorithm as discussed earlier herein. Reference will now be made to FIGS. 4A and 4B which show the use of the cushion architecture when implementing a two dimensional AllReduce algorithm. FIG. 4A shows a three dimensional view of a 3×3 cushion connected network. There are three rings in the X plane and three rings in the Y plane. For the sake of clarity, not all nodes are labelled, but a ring in the horizontal plane and the ring in the vertical plane are fully defined. That is, the top ring in the horizontal plane comprises nodes Na1, Nb1 and Nc1 which are nodes in the front face of the cushion, and N'a1, N'b1 and N'c1 which are nodes in the rear face of the cushion. As the links are bi-directional, there are two rings in different directions, one direction (starting at Na1): Na1, Nb1, Nc1, N'c1, N'b1, N'a1. In the other direction, starting again at Na1, Na1, N'a1, N'b1, N'c1, Nc1, Nb1.

In the vertical (Y) direction, the extreme most left hand ring is formed by nodes Na1, Na2, Na3 (in the front face) and N'a3, N'a2 and N'a1 (in the rear face). Once again, the ring can operate in two directions due to the bi-directional links.

FIG. 4B shows the constructions of FIG. 4A laid out so that the configuration of the rings can be more clearly seen. The nodes in FIG. 4B are numbered correspondingly to the nodes in FIG. 4A. According to one embodiment, the AllReduce algorithm can be implemented by a one-dimensional algorithms as described below with reference to FIGS. 5A and 5B, operated in two dimensions in a manner similar to that discussed in the Jain paper referred to earlier. Note that, however, in contrast the application of the two-dimensional algorithm to an asymmetric toroid as discussed in Jain, the cushion configuration herein is fully bandwidth efficient. Moreover, there is a significant additional advantage with the cushion topology described herein, in that it lends itself readily to partitioning into smaller portions (cushions).

The nodes with a dark outline (the 4×4 group of nodes in the bottom left-hand corner of the array) represent a partitioned cushion that is an allocated set of nodes from the main set. The corner nodes of the front layer are labelled 420 and the corner nodes of the rear layer are labelled 422. The four active links for each node are shown in black or dark grey illustrating whether they form part of a vertical or horizontal link respectively. The facing corner nodes are each connected by two links, a black and a dark grey because these form the terminations of both horizontal and vertical rings. The remaining edge nodes on the horizontal edge connect the facing layers only through a single activated link (dark grey) which forms the termination of vertical rings only. Conversely, the edge nodes on the vertical edges are connected only through one black link which represents the termination of horizontal rings.

The links between corresponding facing central nodes are de-activated (light grey). Furthermore, the links of nodes outside the partitioned cushion (for example, the vertical links from nodes 420 and 422 are de-activated). Note, however, that the de-activation of these links would not prevent the forming of a second cushion comprising the nodes in the upper two rows of the array.

Partitioning of the array into one or more partitioned cushions can be carried out in any suitable way. FIG. 4 illustrates schematically an allocation engine 412 which carries out the partitioning by activating or de-activating the links accordingly. It will readily be appreciated that this allocation engine may be implemented by distributing appropriate code across processing nodes themselves, or by an external manager capable of issuing instructions to the network for the activation of links on each processing node. For example, each processing node could be provided with a control plane and a data plane. The data plane is responsible for compute on the data (such as the reductions described herein, and the generation of partials). The control plane may be responsible for exchange code for managing the transmission of data items as described herein. A host may be responsible for allocating code to the processing nodes in the computer. This is the case when the computer is being used as an accelerator, for which it is particularly suitable when implementing machine learning and other high-processing requirement applications. A host can load computer code into each of the processing nodes in a boot stage, and this code can include connectivity code which controls the connectivity to allocate the operating processing nodes in a particular cushion. For example, this could be done by allocating each node to a particular index (for example, an XY coordinate) and defining the connectivity of that processing node based on the index.

A particular advantage of being able to partition the network into separate "cushions" is that each cushion has multiple rings, which can be used to efficiently implement a ring Allreduce collective.

Figure 2:
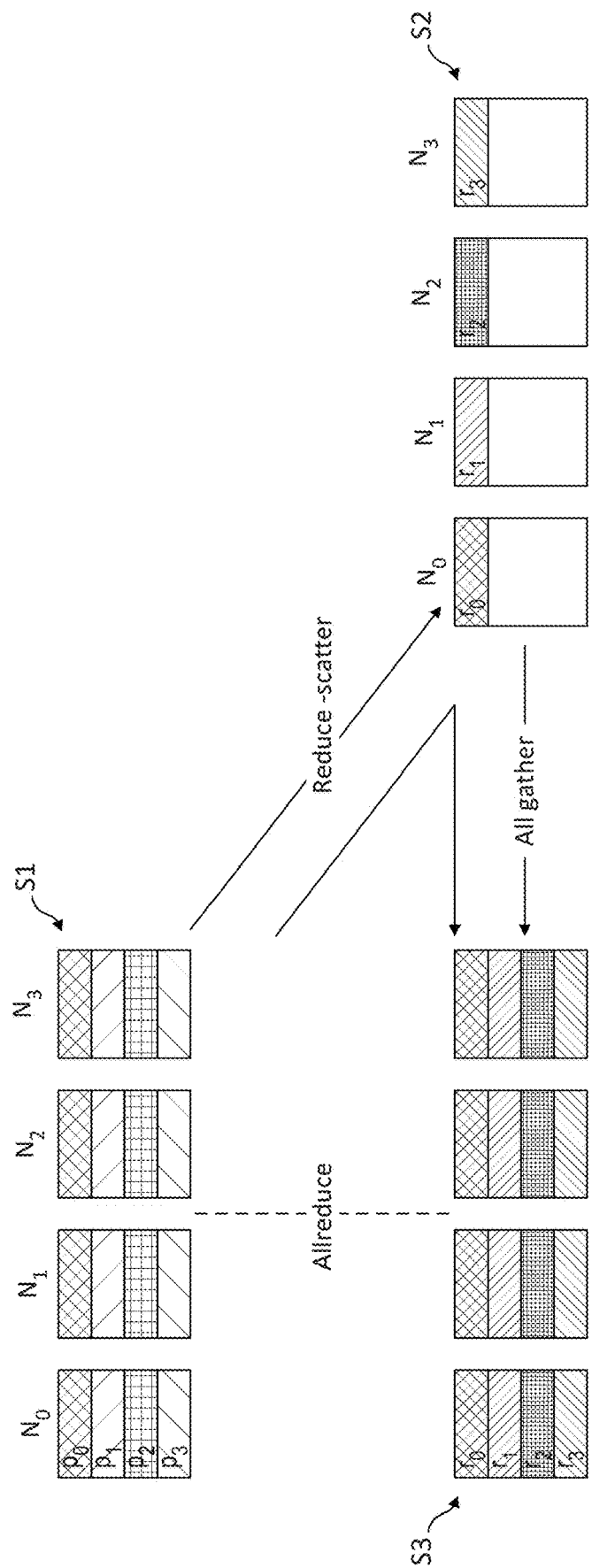
FIG. 2 is a schematic diagram illustrating implementation of an Allreduce function by a reduce-scatter step followed by Allgather step.
Figure 3A:
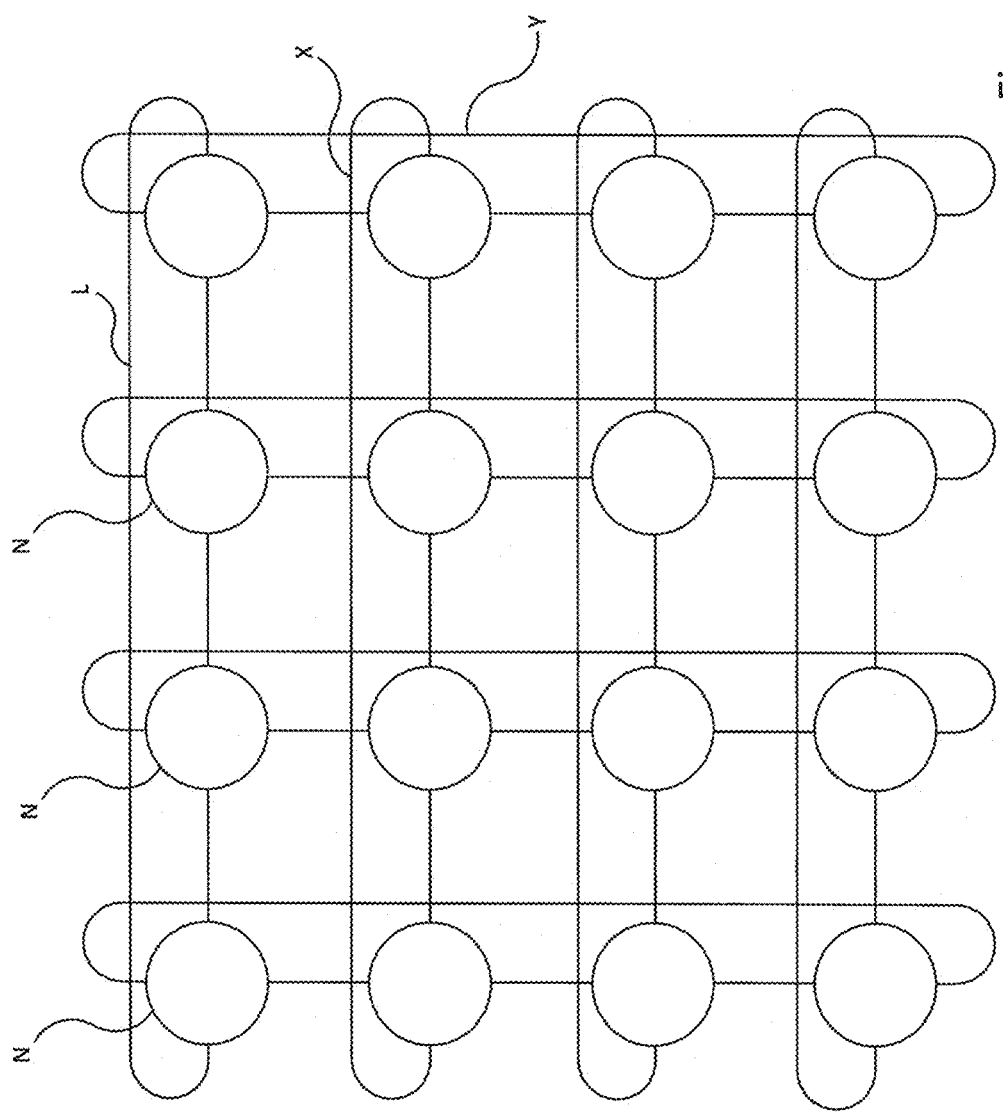
FIG. 3A shows a computer with processing nodes connected in a 4×4 torus configuration.
Figure 3B:
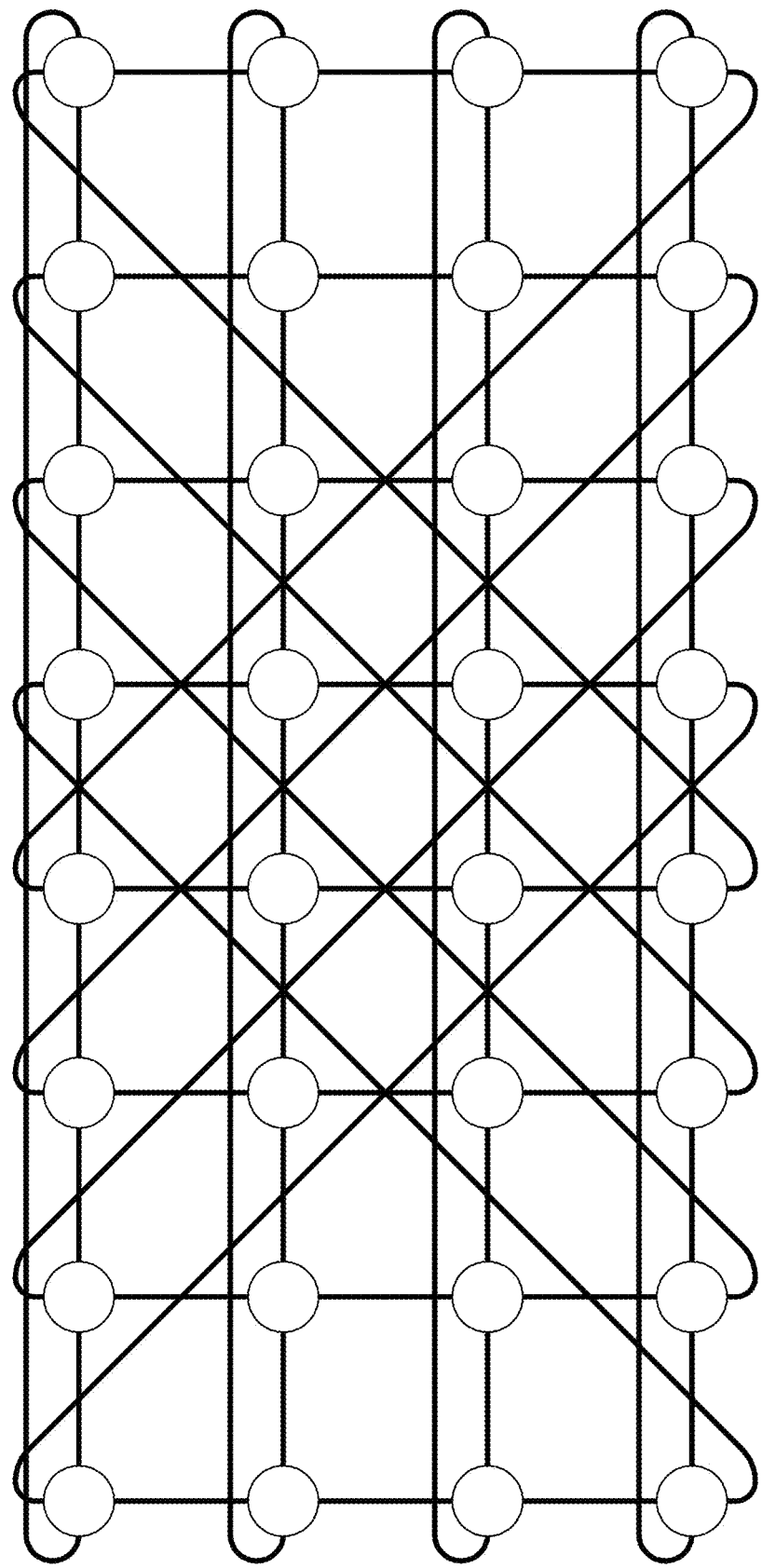
FIG. 3B shows an asymmetrical twisted torus with 4×8 processing nodes.

The Allreduce collective has been described above and is illustrated in FIG. 2. FIG. 2 shows a set (vector) of partial values or "partial" $P_0$, $P_1$, $P_2$, $P_3$ on each of four nodes in a starting state S1. In this context a node is a processing node in a network of processing nodes. Note that each node $N_0$, $N_1$, $N_2$, $N_3$ has four "corresponding" partials, which are hatched accordingly—large diamond grid, wide downward diagonal stripe, large square grid, wide upward diagonal stripe. That is, each partial has a position in a vector such that P0(n) has the same position in its vector on node n as P0 (n+1) in its vector on node n+1. The suffix (n) is used to denote the node in which the partial resides—thus P0(0) is the partial P0 on node N0. In a reduce-scatter pass, corresponding partials are reduced and the reduction provided to one of the nodes. For example, partials P0(0), P0(1), P0(2), P0(3) are reduced (to $r_0$) and placed onto node N0. Similarly, partials P1(0), P1(1), P1(2) and P1(3) are reduced (to $r_1$) and placed onto node N1. And so forth so that in an intermediate state S2, each node has one of the reductions $r_0$, $r_1$, $r_2$ and $r_3$. As explained, the reduction may be by any combinational function f ($Pi_0^3$)—which could include independent operators (e.g. max) or associative operators=P1 (N0)*P1(N1) *P1(N2)*P1(N3). Then, in an Allgather pass, each reduction is provided to all nodes to activate a state S3 wherein each node now holds all four reductions. Note that in S1, the "corresponding" partials, e.g. P0(0), P0(1), P0(2) and P0(3) may all differ whereas, in state S3, each reduction, e.g. $r_0$ is the same at all nodes, where $r_i$=f{(P$_i$(0), P$_i$(1), P$_i$(2) and P$_i$(3))}. In machine learning, the set of partials P0, P1, P2, P3 is a vector. A vector of partials (e.g. updated weights) is produced on each pass of the model during training. The reduction $r_0$ (diamond grid), $r_1$ (downward diagonal stripe), $r_2$ (square grid), $r_3$ (upward diagonal stripe) on each node in state S3 is the full reduction vector. In the context of machine learning, each partial could be a set of updating deltas for a parameter in the model. Alternatively (in an arrangement not described further herein) it could be an updated parameter itself.

Figure 5A:
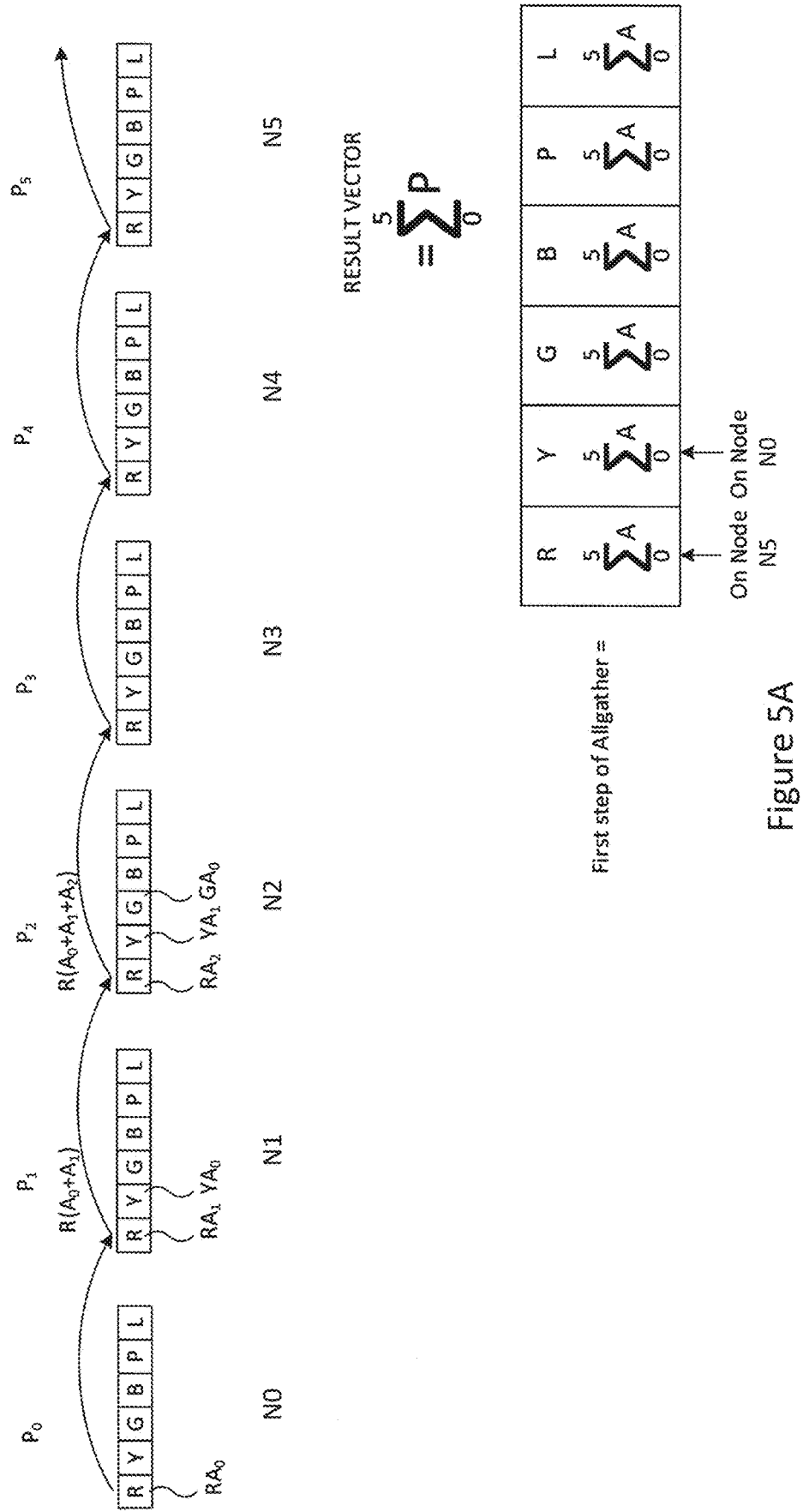
FIGS. 5A and 5B illustrate a bucket based algorithm for Allreduce for use on the cushion topology.
Figure 5B:
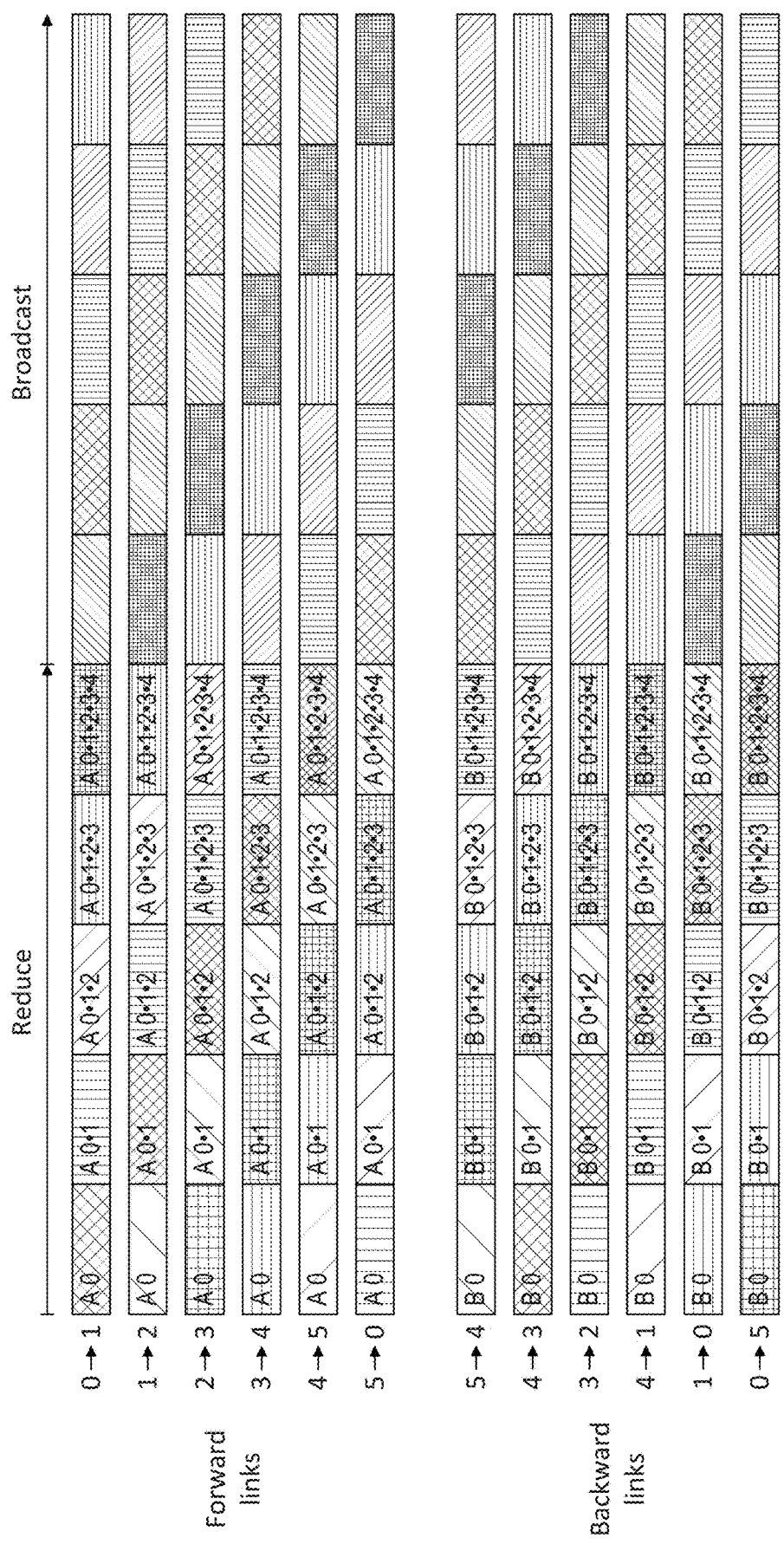

FIGS. 5A and 5B illustrate a bucket based algorithm for reduce-scatter/Allgather that assumes six "virtual" 1D rings. These are termed "logical" rings herein. FIG. 5A is a schematic diagram illustrating the reduction of partials in multiple virtual rings. Each partial is split into six fragments. In FIG. 5A, the capital letters R, Y, G, B, P, L each denote a different fragment of a partial stored at each node indicated by hatching diamond grid, upward diagonal stripe, square grid, horizontal stripe, downward diagonal stripe, vertical stripe. The letters denote corresponding fragments which are to be reduced with each other, and define the "virtual" or "logical" ring for those fragments. Looking at FIG. 5A, the "R" fragments in each of the partials P0, P1, P2, P3 and P4 are reduced into a single fragment in the result vector (R$\Sigma$A$_0^5$). Similarly for the Y, G, B, P and L fragments.

FIG. 5B shows a timing diagram with time on the horizontal axis indicating the data exchanges and computations in each step of the Allreduce process. In FIGS. 5A and 5B, the Allreduce process is accomplished by a reduce-scatter phase followed by an Allgather phase. In FIG. 5B each of the fragments are denoted by different hatchings as described above.

The notation in FIGS. 5A and 5B is as follows. The partials are each denoted P0, P1, P2, P3, P4, P5. At the start of the process, each partial is stored on a respective node N0, N1, N2, N3, N4, N5. Each fragment is labelled according to its fragment ordinant and its position in the virtual ring in which it is deemed to be reduced. For example, RA0 denotes the R fragment in partial P0, because this is the first fragment in a virtual ring formed by nodes N0-N1-N2-N3-N4-N0. RA1 denotes the R fragment at node N1, which is in the second position in its virtual ring. YA0 denotes the Y fragment at node N1. The "0" suffix indicates it is the first fragment in its virtual ring, the Y-ring being N1-N2-N3-N4-N0-N1. Note in particular that the suffixes on A reflect the virtual rings, and do not correspond to the physical nodes (or the partials). Note that FIG. 5A shows only the virtual rings on the forward links. FIG. 5B shows that an equivalent process is occurring on the backward links, with the fragments denoted as B.

In step one, the first fragment (the A0) in each virtual ring is transferred from its node to the next adjacent node where it is reduced with the corresponding fragment at that node. That is, RA0 moves from N0 to N1 where it is reduced into R(A0+A1). Once again, the "+" sign is used here as a shorthand for any combinatorial function. Note that in the same step the A0 fragments of each virtual ring will simultaneously be being transmitted. That is, the link between N1 and N2 is used to transmit YA0, the link between N2 and N3 is used to transmit GA0, et cetera. In the next step, the corresponding reduced fragments are transmitted over the forward links to their next adjacent node. For example, R(A0+A1) is transmitted from N1 to N2, and Y(A0+A1) is transmitted from N2 to N3. Note that for reasons of clarity not all fragments are numbered, nor are all transmissions numbered in FIG. 5A. The full set of fragments and numbers are shown in FIG. 5B. This process carries on for five steps. After five steps, there is a reduction of all fragments on each node. At the end of the fifth step, this reduction is on the last node of each corresponding ring for that fragment. For example the R reduction is on node N5.

The beginning of the Allgather phase starts by a transmission from the last to the first node in each virtual ring. Thus, the final reduction for the R fragments ends on node N5 ready for the first step of the Allgather phase. The final reduction of the Y fragments correspondingly ends up on the node N0. In the next step of the Allgather phase, the reduced fragments are transmitted again to their next adjacent node. Thus the fully reduced R fragment is now also at N2, the fully reduced Y fragment is now also at N3 and so on. In this way, each node ends up at the end of the Allgather phase with all fully reduced fragments R, Y, G, B, P, L of the partial.

Implementation of the algorithm can be achieved if the computation required for the reduction can be concealed behind the pipeline latency. Note that in forming suitable rings in a computer for implementation of Allreduce, a tour of the ring must visit each node in the ring only once. The algorithm described above uses six "pipelined" logical rings in a physical one-dimensional ring. The principle can be extended to two dimensions in the cushion. For full bandwidth utilisation, not only are rings used in a horizontal direction, but also in a vertical direction. Consider for example the node $N_{a1}$. The partial at node $N_{a1}$ is split into two halves. Note for the purpose of this discussion that the effect of bi-directionality in the links is ignored for now. In fact, everything that is described herein is mirrored in the opposite direction. Reverting to node $N_{a1}$ the partial to be transmitted from this node is split into two halves. A first half of the partial is reduce-scattered (according to the one-dimensional line algorithm described above) around the ring in the X direction, and the other half is reduce-scattered around the ring in the Y direction. The same thing is happening at each node in the cushion. Note that (according to the one-dimensional algorithm described above), in fact, what is transmitted in each step on the X ring or Y ring respectively is a corresponding fragment for that step of the logical ring. When the reduce-scatter operations in the X and Y rings have been completed, the algorithm reverts back to the first node in each ring (consider node $N_{a1}$) and swaps over the partials. That is, it now reduce-scatters the first set of the reductions resulting from the first pass round the X ring in the Y direction, and conversely reduce-scatters the first pass of reductions from the Y ring around the X ring.

After this phase, the fully reduced fragments are subject to an Allgather step, according to the one-dimensional ring algorithm described above. The first sets of the fully reduced fragments are Allgathered round the Y rings, and the second set of the fully reduced fragments are Allgathered around the X rings. Then, once again, the partially gathered sets are swapped and an Allgather process takes a first set around the X rings, and the second set around the Y rings. The final result is a fully reduced complete vector at each node. As the number of nodes in the rings in both the X and Y directions are the same, the process has full bandwidth utilisation in all phases (that is all links are operating).

Each node is capable of implementing a processing or compute function. Each node could be implemented as a single processor. It is more likely, however, that each node will be implemented as a single chip or package of chips, wherein each chip comprises multiple processors. There are many possible different manifestations of each individual node. In one example, a node may be constituted by an intelligence processing unit of the type described in British applications with publication numbers GB2569843; GB2569430; GB2569275; the contents of which are herein incorporated by reference. However, the techniques described herein may be used on any type of processor constituting the nodes. What is outlined herein is a computer topology which can be partitioned in an efficient manner to maintain "rings" which are useful in executing collectives in machine learning models. Furthermore, the links could be manifest in any suitable way, subject only to the criteria that they are bi-directional. As mentioned, one particular category of communication link is a SERDES link which has a power requirement which is independent of the amount of data that is carried over the link, or the time spent carrying that data. SERDES is an acronym for Serializer/DeSerializer and such links are known. In order to transmit a signal on a wire of such links, power is required to be applied to the wire to change the voltage in order to generate the signal. A SERDES link has the characteristic that power is continually applied to the wire to maintain it at a certain voltage level, such that signals may be conveyed by a variation in that voltage level (rather than by a variation between 0 and an applied voltage level). Thus, there is a fixed power for a bandwidth capacity on a SERDES link whether it is used or not. A SERDES link is implemented at each end by circuitry which connects a link layer device to a physical link such as copper wires. This circuitry is sometimes referred to as PHY (physical layer). PCIe (Peripheral Component Interconnect Express) is an interface standard for connecting high speed computers.

Deactivation of the links in non-allocated partitions can save power. While in theory the links could be deactivated to consume effectively no power in an allocated cushion, in practice the activation time and non-deterministic nature of machine learning applications can render dynamic activation during program execution as problematic. As a consequence, the present inventor has determined that it is better to make use of the fact that the chip to chip link power consumption is essentially constant for any particular configuration, and that therefore the best optimisation is to maximise the use of the physical links by maintaining chip to chip traffic within a "cushion" concurrent with IPU activity as far as is possible.

SERDES PHYs are full duplex (that is a 16 Gbit per second PHY supports 16 Gbits per second in each direction simultaneously), so full link bandwidth utilisation implies balanced bi-directional traffic. Moreover, note that there is significant advantage in using direct chip to chip communication as compared with indirect communication such as via switches. Direct chip to chip communication is much more power efficient than switched communication.

Another factor to be taken into consideration is the bandwidth requirement between nodes. An aim is to have sufficient bandwidth to conceal inter node communication behind the computations carried out at each node for distributed machine learning.

The links are physical links provided by suitable buses or wires as mentioned above. In one manifestation, each processing node has a set of wires extending out of it for connecting it to another processing node. This may be done for example by one or more interface of each processing node having one or more port to which one or more physical wire is connected.

In another manifestation, the links may be constituted by on-board wires. For example, a single board may support a group of chips, for example four chips. Each chip has an interface with ports connectable to the other chips. Connections may be formed between the chips by soldering wires onto the board according to a predetermined method. Note that the concepts and techniques described herein are particularly useful in that context, because they make maximise use of links which have been pre soldered between chips on a printed circuit board.

The concepts and techniques described herein are particularly useful because they enable optimum use to be made of non-switchable links. A configuration may be built by connecting up the processing nodes as described herein using the fixed non switchable links between the nodes.

In some embodiments, in order to use the configuration, a set of parallel programs are generated. The set of parallel programs contain node level programs, that is programs designated to work on particular processing nodes in a configuration. The set of parallel programs to operate on a particular configuration may be generated by a compiler. It is the responsibility of the compiler to generate node level programs which correctly define the links to be used for each data transmission step for certain data. These programs include one or more instruction for effecting data transmission in a data transmission stage which uses a link identifier to identify the link to be used for that transmission stage. For example, a processing node may have two or three active links at any one time (double that if the links are simultaneously bidirectional). The link identifier causes the correct link to be selected for the data items for that transmission stage. Note that each processing node may be agnostic of the actions of its neighbouring nodes—the exchange activity is pre compiled for each exchange stage.

Note also that links do not have to be switched—there is no need for active routing of the data items at the time at which they are transmitted, or to change the connectivity of the links.

As mentioned above, the configurations of computer networks described herein are to enhance parallelism in computing. In this context, parallelism is achieved by loading node level programs into the processing nodes of the configuration which are intended to be executed in parallel, for example to train an artificial intelligence model in a distributed manner as discussed earlier. It will be readily appreciated however that this is only one application of the parallelism enabled by the configurations described herein. One scheme for achieving parallelism is known as "bulk synchronous parallel" (BSP) computing. According to a BSP protocol, each processing node performs a compute phase and an exchange phase which follows the compute phase. During the compute phase, each processing nodes performs its computation tasks locally but does not exchange the results of its computations with the other processing nodes. In the exchange phase, each processing node is permitted to exchange the results of its computations from the preceding compute phase with the other processing nodes in the configuration. A new compute phase is not commenced until the exchange phase has been completed on the configuration. In this form of BSP protocol, a barrier synchronisation is placed at the juncture transitioning from the compute phase into the exchange phase, or transitioning from the exchange phase into the compute phase or both.

In the present embodiments, when the exchange phase is initiated, each processing node executes an instruction to exchange data with its adjacent nodes, using the link identifier established by the compiler for that exchange phase. The nature of the exchange phase can be established by using the MPI message passing standard discussed earlier. For example, a collective may be recalled from a library, such as the all reduced collective. In this way, the compiler has precompiled node level programs which control the links over which the partial vectors are transmitted (or respective fragments of the partial vectors are transmitted).

It will readily be apparent that other synchronisation protocols may be utilised.

While particular embodiments have been described, other applications and variants of the disclosed techniques may become apparent to a person skilled in the art once given the disclosure herein. The scope of the present disclosure is not limited by the described embodiments but only by the accompanying claims.

The invention claimed is:

1. A computer comprising a plurality of processing nodes arranged in respective front and rear layers, each layer comprising a two-dimensional array of processing nodes, each processing node having a set of activatable links which, when activated, enable a transmission of data items between the processing node and an adjacent processing node connected via an activated link and, when not activated, prevent the transmission of data items between the processing node and the adjacent processing node connected via an inactive link, the set of activatable links comprising for each processing node in a first layer and a second layer a respective link which connects the processing node to each adjacent node in the two-dimensional array, and to a facing processing node in the second layer or the first layer respectively; and an allocation engine configured to receive an allocation instruction and connected to the processing nodes to selectively activate the links to connect at least a group of the processing nodes in a configuration in which:
(i) links between adjacent nodes within each of the first layer and the second layer respectively are activated;
(ii) links between facing nodes are only activated for edge processing nodes of the group; and
(iii) links between processing nodes outside the group and adjacent processing nodes in the group are deactivated.

2. The computer according to claim 1 wherein the set of activatable links comprises two such respective links connecting the processing node to its facing processing node.

3. The computer according to claim 2 wherein in the configuration two links are activated between corner facing nodes of the group.

4. The computer according to claim 1 wherein the links are bi-directional links.

5. The computer according to claim 1, wherein the two-dimensional array is an array of n by m processing nodes, and wherein the group comprises an array of p×q processing nodes in the first layer where at least one condition is satisfied: p is less than n or q is less than m.

6. The computer according to claim 5 where m equals n.

7. The computer according to claim 5 where p equals q.

8. The computer according to claim 1 wherein each link when activated has a fixed power requirement independent of data traffic.

9. The computer according to claim 1 wherein each link when deactivated consumes no power.

10. The computer according to claim 1 wherein the allocation engine comprises one or more processor configured to execute allocation computer code responsive to a user request.

11. A method of configuring a computer comprising a plurality of processing nodes arranged in respective front and rear layers, each layer comprising a two-dimensional array of processing node, each processing node having a set of activatable links which, when activated, enable a transmission of data items between the processing node and an adjacent processing node connected via an activated link and, when not activated, prevent the transmission of data items between the processing node and the adjacent processing node connected via an inactive link, the set of activatable links comprising for each processing node in a first layer and a second layer a respective link which connects the processing node to each adjacent node in the array, and to a facing processing node in the second layer or the first layer respectively, the method comprising:
- selectively activating the links of each processing node in at least a group of the processing nodes to generate a networked configuration of processing nodes in which:
  (i) links between adjacent nodes within each of the first layer and the second layer respectively activated;
  (ii) links between facing nodes are only activated for edge processing nodes of the group; and
  (iii) links between processing nodes outside the group and adjacent the processing nodes are deactivated.

12. The method according to claim 11 selectively activating a link comprises providing power to a link, wherein the links have a power requirement independent of transmitted traffic.

13. The method according to claim 12 wherein the links operate to transmit data by a variation in voltage from a powered voltage level on the link.

14. The method according to claim 11 comprising the further step of
- operating the group of the processing nodes in the networked configuration using m rings in each of two dimensions, where each ring is formed by n nodes, where n is a number of edge processing nodes in the networked configuration.

15. The method according to claim 14 comprising dividing a partial vector generated at each processing node of the networked configuration into fragments and implementing logical rings for the fragments in the partial vector to implement an Allreduce collective.

16. The method according to claim 15 wherein an Allreduce collective is implemented by a reduce-scatter collective followed by an Allgather collective in the logical rings.

17. The method according to claim 15 comprising implementing the logical rings in forwards and backwards directions in each dimension.

18. The method according to claim 16 comprising implementing the logical rings in forwards and backwards directions in each dimension.

19. A computer comprising a plurality of processing nodes arranged in respective front and rear layers, each layer comprising a two-dimensional array of processing nodes, each processing node having a set of activated links which enable a transmission of data items between the processing node and an adjacent processing node connected via an activated link, wherein the processing nodes are connected in a configuration in which:
(i) adjacent nodes within each of a first layer and a second layer are connected by activated links;
(ii) edge-processing nodes in each of the first layer and the second layer are connected by activated links to their facing node in a corresponding layer; and
(iii) any links between additional processing nodes outside the configuration and the processing nodes connected in the configuration are deactivated such that the transmission of data items is prevented between the processing nodes connected in the configuration and the additional processing nodes outside the configuration.

20. The computer according to claim 19, wherein the processing nodes of the configuration form a set of connected rings in each of X and Y directions, wherein each ring comprises a same number of processing nodes.

* * * * *